United States Patent [19]

DeVries et al.

[11] 4,134,844

[45] Jan. 16, 1979

[54] SOLID PARTICLES CONTAINING LUBRICATING OIL COMPOSITION AND METHOD FOR USING SAME

[75] Inventors: Donald L. DeVries, South Holland; James M. DeJovine, Homewood, both of Ill.

[73] Assignee: Atlantic Richfield Company, Philadelphia, Pa.

[21] Appl. No.: 893,098

[22] Filed: Apr. 3, 1978

Related U.S. Application Data

[63] Continuation-in-part of Ser. No. 752,225, Dec. 20, 1976, Pat. No. 4,094,799.

[51] Int. Cl.[2] .................... C10M 1/10; C10M 3/02; C10M 5/02; C10M 7/04

[52] U.S. Cl. .................... 252/30; 252/25; 252/29; 252/50; 252/51.5 A; 252/401; 252/403

[58] Field of Search .................... 252/29, 30, 51.5 A, 252/25, 50, 401, 403

[56] References Cited

U.S. PATENT DOCUMENTS

| | | | |
|---|---|---|---|
| 3,384,580 | 5/1968 | Peace | 252/29 |
| 3,384,581 | 5/1968 | Peace | 252/30 |
| 3,843,529 | 10/1974 | Bertrand | 252/30 |
| 3,864,268 | 2/1975 | Culbertson et al. | 252/51.5 A |
| 3,872,019 | 3/1975 | Culbertson et al. | 252/51.5 A |
| 4,039,337 | 8/1977 | Broun et al. | 252/29 |
| 4,051,050 | 9/1977 | Elliott et al. | 252/51.5 A |

*Primary Examiner*—Irving Vaughan

*Attorney, Agent, or Firm*—John B. Goodman

[57] ABSTRACT

An improved lubricating oil composition comprising a major amount by weight of oil of lubricating viscosity; a minor amount by weight of solid particles effective to improve the lubricating properties of the composition; and a minor amount of an oxidized olefin polymer which has been reacted with an aliphatic amine or polyamine. Preferably, this reaction occurs in the presence of a formaldehyde-yielding reactant. This composition provides improved inhibition of sludge and varnish formation in use.

12 Claims, No Drawings

SOLID PARTICLES CONTAINING LUBRICATING OIL COMPOSITION AND METHOD FOR USING SAME

CROSS REFERENCE TO RELATED APPLICATION

This application is a continuation-in-part application of application Ser. No. 752,225, filed Dec. 20, 1976 now U.S. Pat. No. 4,094,799; the teachings of which are incorporated by reference herein.

BACKGROUND OF THE INVENTION

This invention relates to improved lubricating oil compositions. More particularly, this invention relates to lubricating oil compositions which include solid materials to enhance the properties of such compositions. improves Oil compositions are conventionally used to lubricate internal combustion engines, for example, such engines which power motor vehicles. Previous studies have indicated that the inclusion of certain solid materials, e.g., graphite, in these oil compositions improve the engine's fuel efficiency. For example, studies reported in "Stable Colloid Additives for Engine Oils — Potential Improvement in Fuel Economy", James E. Bennington et al., Society of Automotive Engineers, Fuels and Lubricants Meeting, Houston, Texas, June 3–5, 1975, indicate that a gasoline mileage improvement of between 3 to 5 percent is obtained by adding one percent graphite to a conventional lubricating oil composition. Such improvement in fuel economy is particularly valuable in view of, for example, the short supply of such fuels.

However, other criteria must be met by lubricating oil compositions in order to be effective in modern internal combustion engines. For example, such compositions are required to meet certain specifications with regard to tendency to form deposits, e.g., varnish, sludge and the like, on engine components. The presence of the solid lubricants in these compositions tends to increase these deposit forming tendencies. A lubricating oil composition containing at least one of certain solid lubricants and having acceptable deposit forming characteristics is clearly desirable.

Therefore, one object of the present invention is to provide an improved lubricating oil composition.

Another object of this invention is to provide a solid particles-containing lubricating oil composition having reduced deposit forming tendency.

A still further object of the invention is to provide an improved method of lubricating an internal combustion engine. Other objects and advantages of the present invention will become apparent hereinafter.

SUMMARY OF THE INVENTION

An improved lubricating oil composition has now been developed. This composition comprises a major amount by weight of oil of lubricating viscosity; a minor amount by weight of solid particles effective to improve the lubricating properties of the composition; and a minor amount by weight of at least one of certain functional polymers. The functional polymers are oxidized polymers which have been reacted with an aliphatic amine or polyamine. Preferably, this reaction occurs in the presence of a formaldehyde-yielding reactant. These oxidized polymers are prepared by reacting simultaneously, at a temperature of about 140°–350° F. an oxidized co-polymer of essentially ethylene and propylene with an aliphatic amine or polyamine, and recovering the resultant reaction product; said reactants being employed in the molar ratio of from about 1:2 to about 1:20.

Preferred oxidized polymers are prepared by reacting simultaneously, at a temperature of about 250°–350° F. an oxidized co-polymer of ethylene and propylene with a formaldehyde-yielding reactant, and an aliphatic amine or polyamine, and recovering the resultant reaction product; said reactants being employed in the molar ratio of from about 1:2:2 to about 1:20:20.

The incorporation of these functional polymers into the present solid particles-containing compositions has been found to provide a surprising degree of reduction in detrimental deposit formation, e.g., on internal combustion engine components lubricated by the present compositions.

DETAILED DESCRIPTION OF THE INVENTION

The oils used in the compositions of the present invention are those conventionally used in lubricant manufacture. The suitable lubricating oils include those having a viscosity within the range of about 50 SUS to about 2000 SUS at 100° F. These oils may be refined or otherwise processed to produce an oil having the desired quality. Although mineral oils are preferred, the oil may be synthetic in nature. The oil used in the present invention is preferably a mineral oil having a viscosity of about 100 SUS to about 1000 SUS at 100° F. Combinations of two or more different oils in a single lubricating composition are within the scope of the present invention. The lubricating oil comprises a major proportion, preferably at least about 60 percent still more preferably at least about 70 percent, by weight of the total composition.

The present compositions include a minor amount by weight of solid particles effective to improve the lubricating properties of the compositions. Preferably, a major portion, by weight, and more preferably substantially all, of such solid particles, have a maximum transverse dimension in the range of about 1 millimicron to about 2 microns, and most preferably in the range of about 1 millimicron to about 1 micron. Suitable solid particles for use in the present invention include those materials known to provide improved lubricating properties to lubricating oil compositions. Such solid particles include, for example, graphite, molybdenum disulfide, zinc oxide, tungsten disulfide, mica, boron nitrate, borax silver sulfate, cadmium iodide, lead iodide, barium flouride, tin sulfide, mixtures thereof and the like. The solid particles useful in the present compositions are preferably selected from the group consisting of graphite, molybdenum disulfide, zinc oxide, and mixtures thereof; more preferably from the group consisting of graphite, molybdenum disulfide and mixtures thereof; and most preferably, graphite.

The solid particles are preferably present in the present compositions in an amount of about 0.05% to about 5%, more preferably about 0.1% to about 2%, by weight of the total composition, The solid particles component of the present composition is preferably prepared as a colloidal suspension, in, for example, a conventional lubricating oil and/or at least one conventional lubricating oil detergent. For example, such colloidal suspensions or concentrates may contain about 2% to about 25% or more, by weight of such solid particles.

Any conventional lubricating oil detergent may be used to aid in stabilizing these colloidal suspensions of the presently useful solid particles. Such detergents are often characterized as comprising at least one surface active compound which, when included in a lubricating oil composition tends to inhibit solid contaminants, e.g., combustion by-product present in the engine's lubricating oil, from adhering to metallic surfaces of engine components. Although both ash-containing, metal-based detergents and ashless detergents are useful as such solid particles-containing suspension, the ashless detergents are preferred.

There are many examples of ash-containing, metal-based detergents which are suitable in such solid particles-containing suspension. The ashless detergents preferred for use are compounds which comprise an oil-solubilizing tail and a polar detergent head. Many ashless detergents fitting this general description are known to the art and are commercially available.

Specific examples of this type of ashless detergent include the polyamino-polyalkylene alkenyl succinimides. Amine salts of alkyl phosphoric acids, are also suitable. Polyamine derivatives of long chained hydrocarbons may also be used. Reaction products of alkylene polyamines with long chained alkenyl succinic anhydrides and long chained esters of Mannich bases are suitable detergents. As can be seen, the required polarity may be supplied by groups containing, for example, oxygen, sulfur, phosphorous, nitrogen and mixtures thereof. All of these suitable ashless detergents may be generally characterized as compounds comprising at least one substantially hydrocarbon portion of sufficient size to render the compound oil-soluble and at least one non-metallic polar portion which when attached to the hydrocarbon portion provides a substantial part, often essentially all, of the detergent action.

To illustrate, specific examples of ashless detergents suitable for use as solid particles stabilizers include polyaminepolyalkylene alkenyl succinimines, long chain polyamines, dihydrocarbon substituted polyamines, substituted-phenol substituted polyamine products and mixtures thereof. The compounds may be represented by the following structures:

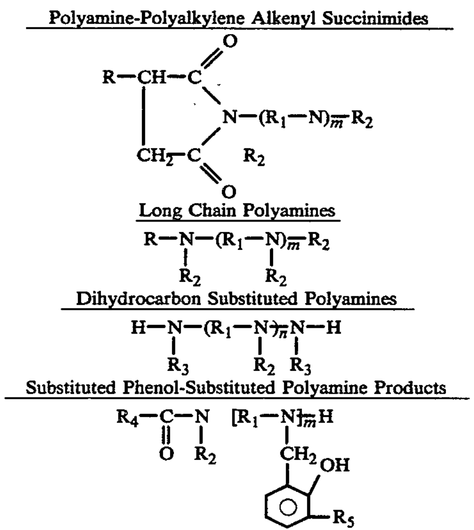

wherein R is a substantially hydrocarbon monovalent radical containing from about 30 to about 250 carbon atoms; each $R_1$ is independently selected substantially hydrocarbon divalent radical containing from 1 to about 8 carbon atoms; each $R_2$ is independently selected from the group consisting of H and substantially hydrocarbon monovalent radicals containing from 1 to about 8 carbon atoms; each $R_2$ is an independently selected substantially hydrocarbon monovalent radical containing from about 15 to about 100 carbon atoms; $R_4$ is substantially hydrocarbon monovalent radical containing from about 4 to about 30 carbon atoms; m is an integer from 1 to about 10, preferably from 2 to about 10 and n is an integer from zero to about 10, preferably from about 2 to about 6.

It is preferred that R and $R_3$ be alkenyl, preferably selected from the group consisting of polypropenyl and polyisobutenyl. It is preferred that each $R_1$ be an independently selected alkylene radical containing from 1 to about 8, more preferably from 2 to about 6, carbon atoms. Suitable alkylene radicals from which each $R_1$ may be independently selected include methylene, ethylene, propylene, butylene, hexylene, octylene and the like. Although each $R_1$ may be independently selected, it is preferred that for any given ashless detergent all the $R_1$'s contained therein are the same radicals.

The substantially hydrocarbon monovalent radicals from which each $R_2$ may be independently selected each contain from 1 to about 8, preferably from 1 to about 4, carbon atoms. These substantially hydrocarbon radicals include alkyl, such as methyl, ethyl, propyl, butyl, hexyl, octyl and the like, alkenyl, such as ethenyl, propenyl, butenyl, hexenyl, octenyl and the like; aryl, alkaryl, aralkyl, alkenaryl and aralkenyl, such as phenyl, methyl phenyl, phenyl ethyl, ethenyl phenyl, phenyl ethenyl and the like.

The substantially hydrocarbon radicals from which $R_4$ is selected contain from 2 to about 30, preferably from about 4 to about 24, carbon atoms. These radicals may be straight chain or branched, saturated or unsaturated, aliphatic (including cycloaliphatic), aromatic or combinations thereof. Examples of suitable radicals include alkyl such as butyl, octyl, decyl, dodecyl, octadecyl, $C_{24}$ alkyl and the like; alkenyl such as butenyl, octenyl, dodecenyl, octydecenyl, $C_{24}$ alkenyl and the like; and aryl, alkaryl, aralkyl, alkenaryl, aralkenyl such as phenyl, benzyl, naphthyl, ethyl phenyl, decyl phenyl, octadecyl phenyl, phenyl butyl, phenyl decyl, phenyl octadecyl, butenyl phenyl, decenyl phenyl, octadecenyl phenyl, phenyl butenyl, phenyl decenyl, phenyl octadecenyl and the like. More preferably, $R_4$ is selected from the group consisting of alkyl and alkenyl containing from about 10 to about 24 carbon atoms.

Each $R_5$ is preferably independently selected from alkyl radicals containing from 4 to about 30, preferably from about 8 to about 20, carbon atoms. Examples of radicals from which each $R_5$ may be independently selected include amyl, octyl, decyl, octadecyl and the like.

The

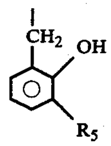

portion of the substituted phenol substituted polyamine acid salts may be replaced by, for example, alkylnaphthols and similar derivatives of biphenyl, terphenyl, phenanthrene, anthracene and the like.

The term "substantially" hydrocarbon radicals referred to herein includes those radicals which are composed primarily of carbon and hydrogen and also includes radicals which contain, in addition, minor amounts of substituents, such as oxygen, halide, sulfur, nitrogen and the like which do not substantially affect the hydrocarbon character of the radicals.

The specific ashless detergents noted above, as well as other of the many suitable ashless detergent materials and methods for preparing these materials are described in the following U.S. Pat. Nos.: 3,237,614; 3,018,247; 3,513,093; 3,753,670; 3,008,993; 3,275,554; 3,473,011; 3,574,576; 3,576,743; 3,578,422; 3,597,174; 3,369,110; 3,652,240; 3,655,351; 3,658,494; 3,658,495; 3,676,089; 3,701,640; 3,711,255; 3,717,447; 3,728,091; 3,746,520; 3,751,255; 3,756,793; 3,762,889; 3,764,281; 3,765,850; 3,773,479; 3,752,657; 3,753,670; 3,779,724 and 3,782,912.

As noted herein before, the compositions of this invention require certain functional polymers.

In accordance with one embodiment of the present invention, the functional polymer lubricant additives are prepared by reacting simultaneously, at a temperature of about 140°–350° F. an oxidized co-polymer of essentially ethylene and propylene with an aliphatic amine or polyamine, and recovering the resultant reaction product; said reactants being employed in the molar ratio of from about 1:2 to about 1:20.

In accordance with another embodiment of the present invention, an aldehyde is also employed. In this embodiment, the functional polymer additive is prepared by reacting simultaneously, at a temperature of about 250°–350° F., an oxidized co-polymer of ethylene and propylene with a formaldehyde-yielding reactant, and an aliphatic amine or polyamine, and recovering the resultant reaction product; said reactants being employed in the molar ratio of from 1:2:2 to about 1:20:20.

In the preparation of the functional polymeric additives employed in this invention it is desirable to conduct the reaction in the presence of a non-reactive organic solvent or diluent, such as, for example, an aromatic hydrocarbon solvent, e.g., benzene, xylene, toluene, etc., or an aliphatic hydrocarbon solvent, such as, for example, hexane. Particularly suitable as a solvent or diluent is low viscosity hydrocarbon oil, such as a solvent extracted SAE 5W mineral oil. The use of a solvent or diluent is advantageous to facilitate the mixing of the reactants, and in the control of the reaction temperatures.

The term "co-polymer" refers to amorphous co-polymers derived from essentially ethylene and propylene: however, such co-polymers may contain minor amounts, i.e., up to 10 percent, based on the molar amounts of the monometric ethylene and propylene units in the co-polymer, of polymerized units derived from other olefin monomers. Such other olefinic monomers include olefins in the general formula RCH — $CH_2$, in which R is an aliphatic or cycloaliphatic radical of from 2 to about 20 carbon atoms, for example, butene-1, hexene-1,4-menthyl-pentene, decene-1, vinylidene norbornene, 5-methylene-2-norbornene, etc. Other olefinic monomers having a plurality of double bonds may be used, in particular diolefins containing from about 4 to about 25 carbon atoms, e.g., 1,4-butadiene, 1,3-hexadiene, 1,4-pentadiene, 2-methyl 1,5-hexadiene, 1,7-octadiene etc.

Suitable ethylene-propylene co-polymers contain from about 30 to about 65, preferably from about 35 to about 45 mole percent propylene, have a number average molecular weight of at least about 20,000, e.g., from about 21,500 to about 200,000 or more, and preferably from about 25,000 to about 40,000, and contain at least 140, and more preferably at least 150, pendant methyl groups per 1,000 chain carbon atoms.

A particularly suitable ethylene-propylene co-polymer is one having the following characteristics:

| | | |
|---|---|---|
| Number average molecular weight | 25,000–35,000 | |
| Percent (Molar) propylene monomer | 38–42 | |
| Pendant Methyl Groups per 1,000 Chain Carbon Atoms | 160–170 | |
| Inherent Viscosity | 1.7–2.0 | (A) |
| Gardner Viscosity | U–V | (B) |
| Mooney Viscosity | 20–35 | (C) |

(A) 0.1 gram copolymer in 100 cc decalin at 135° C.
(B) 8.0% co-polymer in toluene at 25° C.
(C) ASTM D-1646

Methods of preparation of the co-polymers are well-known; such methods are described in many U.S. Patents, such as, among others, U.S. Pat. Nos. 2,700,633; 2,726,231; 2,792,288; 2,933,480; 3,000,866; 3,063,973; 3,093,621 and others.

The oxidation of the co-polymer can be accomplished by contacting the co-polymer under suitable conditions of temperature and at atmospheric or elevated pressures, with an oxidizing agent such as air or free oxygen, or any oxygen-containing material capable of releasing oxygen under the oxidation conditions. If desired, the oxidation can be conducted in the presence of known oxidation catalysts such as platinum or a planinum group metal, and compounds containing metals such as copper, iron, cobalt, cadmium, manganese vanadium etc. The oxidation can be carried out by methods described in U.S. Pat. Nos. 2,982,728; 3,316,177; 3,153,025; and 3,365,499, and 3,544,520.

Generally, the oxidation can be carried out over a wide temperature range, depending upon the oxidizing agent used; for example, with an active oxidizing agent, e.g., $SO_3$, temperatures in the range of −40° F. to 400° F. have been used, while with less active oxidizing agents, e.g., air, temperatures in the range of 100°–800° F. have been used. Further, depending upon the rate desired, the oxidation can be conducted at sub-atmospheric, atmospheric or super-atmospheric pressures, and in the presence or absence of oxidation catalysts. The conditions of temperature, pressure, oxygen content of the oxidizing agent, the rate of introducing the oxidizing agent, the catalyst employed, if any, etc., are correlated and controlled by those skilled in the art, so as to obtain the desired optimum results.

The following will illustrate one method of oxidizing the co-polymer; to a co-polymer of ethylene and propylene (1 part), having a number average molecular weight of about 28,000, is added a solvent-extracted SAE 5W mineral oil (9 parts) in an open reaction vessel, and the mixture slowly stirred and heated at a temperature of 360° F., under an inert gas atmosphere, until solution of the rubber-like polymer in the solvent is effected. Maintaining the 360° F. temperature, the mixture is rapidly agitated in an atmosphere composed of 50 percent air and 50 percent nitrogen, to promote the oxidation of the co-polymer. A 50:50 air-nitrogen ratio is used to preclude the possibility of an explosive mixture being formed. Reaction in the described manner is continued for 2.5–4.0 hours. About 2.5–4.5 oxygen atoms per molecule of the co-polymer are introduced under such oxidation conditions.

The amine reactant used in the preparation of the functional polymers of the present invention are primary or secondary aliphatic amines and diamines of the general formula $H_2N(CH_2)_yNH_2$, wherein y is an integer 3 to 10, said amines and diamines containing up to about 10 carbon atoms in the alkyl group, the polyalkylene polyamines of the general formula

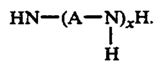

wherein A is a divalent alkylene radical of about 2 to about 6 carbon atoms, and x is an integer from 1 to about 10. Illustrative of suitable amines are: methylamine, dibutylamine, cyclohexylamine, propylamine decylamine, ethylene diamine, trimethylene diamine, tetramethylene diamine, hexamethylene diamine, diethylene triamine, triethylene tetramine, tetraethylene pentamine, tripropylene tetramine, tetrapropylene pentamine, and other polyalkylene polyamines in which the alkylene groups contain suitably up to about 10 carbon atoms.

Illustrative of aldehydes suitable for use in accordance with the other embodiment of the present invention are aliphatic aldehydes such as, for example, formaldehyde, acetaldehyde, B-hydroxybutyraldehyde. Preferred are formaldehyde or a formaldehyde-yielding compound such as paraformaldehyde and formalin.

Although average molecule weights in the range from about 1,500 to about 20,000 are suitable, preferably, the aminated oxidized co-polymers have number average molecular weights in the range of from about 20,000 to about 200,000, or more, and most preferably in the range of from about 25,000 to about 40,000.

The chemical composition of the reaction product which comprise the functional polymers cannot be characterized with preciseness by chemical structural formula. However, it is believed that the oxidation of the co-polymer produces predominately ketones, and minor amounts of aldehydes, acids and perhaps esters. As a result of the complex nature of the oxidized reaction product, the precise composition of such product cannot be defined by its chemical structure, but rather must be defined by its method of preparation.

The compositions of the present invention preferably contain about 0.1 to about 20% by weight (based on the total composition) of at least one of the above-described functional polymer additives, more preferably, about 3% to about 10% by weight of the total composition. Preferably, the amount by weight of such polymers in the compositions of this invention is at least equal to the amount of solid particles, e.g., graphite, molybdenum disulfide and the like, present. More preferably, the amount of functional polymer additive is at least about 2 times, still more preferably at least about 3 times, the amount of solid particles.

The compositions of the present invention possess the advantageous combination of a high degree of effectiveness with respect to lubricity, dispersant-detergent properties, pour-point depressing action and viscosity index improvements. Further, the present compositions provide for improved fuel economy and reduced tendency to form deposits.

In addition to the advantages already described herein, lubricating compositions contemplated herein may contain other conventional agents, such as, for example, anti-oxidants, metal deactivators, pour point depressants, oiliness agents, blooming agents, peptizing agents, and the like.

The lubricating compositions of the present invention may be prepared in any conventional manner. For example, the various components may be brought together and blended at a slightly elevated temperature, i.e., about 100 to 130° F., to insure a uniform composition.

In many instances, the additives incorporated into the present lubricating compositions are available as a mixture in a mineral oil or other solvent carrier. Unless otherwise noted, the weight proportions given above refer to the amount of additive material on a carrier or solvent free basis.

The lubricating compositions of the present invention can be used to lubricate internal combustion engines. Maintaining (or causing to be maintained) a lubricating amount of the lubricating compositions of the present invention on the components of such internal combustion engine requiring lubrication, results in obtaining substantial benefits from the present invention.

The following examples illustrate clearly the present invention. However, these examples are not to be interpreted as specific limitations on the invention.

EXAMPLES 1 - 4

The followng examples illustrate certain of the outstanding benefits of the present invention.

A series of four lubricating oil compositions were prepared by blending together individual components, noted below, at a slightly elevated temperature, i.e., about 100° F. to about 130° F., to insure proper mixing. The final compositions were as follows:

| | Examples | | | |
|---|---|---|---|---|
| Component, Wt.% | 1 | 2 | 3 | 4 |
| Mineral Oil, 125 SUS at 100° F. | 84.0 | 74.7 | 67.5 | 67.5 |
| Conventional Additive Mixture(1) | 7.4 | 7.5 | 7.5 | 7.5 |
| Methacrylate Polymer(2) | 8.6 | 7.8 | — | — |
| Functional Polymer(3) | — | — | 15.0 | — |
| Functional Polymer(4) | — | — | — | 15.0 |
| Graphite Dispersion(5) | — | 10.0 | 10.0 | 10.0 |

(1) This mixture is a commercially available combination of materials each of which is conventionally used in lubricating oil compositions. This mixture includes alkyl zinc dithiophosphate, both overbased and neutral calcium sulfonates, calcium phosphonatephenate and both an ashless dispersant and an ashless rust inhibitor. This mixture also included about 50% by weight of a light mineral oil as solvent for the active ingredients.

(2) A commercially available methacrylate polymer known and conventionally used to improve the viscosity index of lubricating oil polymers. Such polymer includes essentially no N-vinyl pyrrolidone. The material as used includes about 50% by weight of a mineral oil as solvent for the polymer. The polymer is believed to have an average molecular weight of about 800,000 and to be derived from a methacrylic ester containing about 16 carbon atoms per molecule.

(3) A functional polymer of the invention comprising the reaction product of the following reaction. Five hundred grams of an ethylenepropylene co-polymer, having a number average molecular weight of 1,800–2,000, are placed in an open reaction vessel and heated at 310° F. for 3 hours while being vigorously stirred. At the end of 3 hours the oxidation is complete. The oxygen content of the product was 3.7 percent.

0.285 mole of the oxidized co-polymer, is heated at 300° F., under 1.0 CFH nitrogen, while 49 grams (0.258 mole) tetraethylene pentamine (TEPA) is added over a 10 minute period. Heating and moderately rapid stirring is continued for 1 hour, during which time water formed as a by-product is swept from the reaction zone with nitrogen bleed. The recovered product contains 1.25 percent nitrogen (theoretical 1.25 percent).

(4) A functional polymer of the invention comprising the reaction product of the following reactions. An amorphous ethylene-propylene co-polymer is prepared by solution polymerization using a Ziegler-Natta type catalyst, vanadium oxytrichloride solution in combination with an ethylaluminum sesquichloride solution. Dry n-heptane (1200 ml.) is saturated at 86° F. and 30 p.s.i.g. with a gas mixture consisting of 50 mole percent ethylene, 35 mole percent propylene and 15 mole percent hydrogen. The gas mixture is introduced at the rate of 100 liters per hour, circulated through the heptane, and then passed out of the system. When saturation is complete, the addition of the catalyst components, in heptane solution is started. The vanadium oxytrichloride solution (0.370 percent by weight) is introduced into the olefin mixture at the rate of 13 ml/hr., and the ethylaluminum sesquichloride solution (0.459 percent-wt.) at the rate of 60 ml/hr.; the molar ratio of Al/V is 8.06. When polymerization begins the inflow of the propylene and of the ethylene is adjusted to compensate for the greater reactivity of the latter. The average ratio of propylene-/ethylene by weight is 2.3. After 1.25 hours polymerization is stopped by displacing the gas mixture with nitrogen and stopping the catalyst addition. The reaction mixture is then washed twice with methanol to deactivate and remove the catalyst.

The recovered co-polymer has a number average molecular weight ($M_n$) of 28,000 (determined by vapor pressure osmometry); 159 pendant methyl groups per 1000 chain carbon atoms (determined by infrared spectoscopy), and an inherent viscosity of 2.28 dl/g. (measured in decalin at 135° C. and 0.1 g./100 ml.).

A solution of 170 grams of the co-polymer, in 1000 grams of heptane heated to 250° F., while blowing, with nitrogen, to remove the heptane, and 280 grams of a SAE 5W mineral oil is gradually added as the heptane is removed, and the viscous oil co-polymer mixture brought to 430° F. with vigorous stirring. Blowing with nitrogen is discontinued at this point, to allow atmospheric oxygen to diffuse into the reaction vessel. After 0.5 hour, thermal and oxidative degradations reduced the viscosity of the mixture such that vigorous stirring could be maintained at the optimum oxidation temperature of 310° F. Heating with stirring is continued at such temperature for a total of 2.5 hours. The resulting product is an oil solution of oxidized co-polymer.

66.5 grams of the oil solution of the oxidized co-polymer (20.0 percent active oxidized co-polymer) is added to 900 grams of benzene, and the solution heated to 120° F. Solid paraformaldehyde (0.69 grams, 0.52 percent by weight on oxidized co-polymer) is then added and the mixture heated to a temperature of 140° F. over a 0.5 hour period. Hexamethylene diamine (2.66 grams; 2.0 percent by weight on the oxidized co-polymer) is then added and the solution is refluxed vigorously for three hours at 176° F. The resultant functional polymer product is then heated at 300° F., with nitrogen blowing, for one hour to remove the benzene solvent.

(5) A mineral oil-based dispersion containing about 10% by weight of solid graphite particles which have an average (by weight) particle size of about 200 millimicrons. The dispersion also includes about 6% of a nitrogen and methacrylate-containing dispersant to aid in maintaining dispersion stability. This dispersant is believed to be derived from a methacrylic ester containing about 16 carbon atoms per molecule.

Each of these lubricating oil compositions identified in Examples 1 and 2 was used to lubricate an internal combustion engine which, in turn, was operated through a Reference Sequence V C Test. This test, in which the engine is operated for 192 hours, is described in "Multicylinder Test Sequences for Evaluating Automotive Engine Oils"—ASTM Special Technical Publication (1973). This procedure is known to produce data which can be used to make valid comparisons of the effects various lubricating oil compositions have on engine sludge and varnish ratings under normal operating conditions.

Sludge and varnish ratings in the Reference Sequence V C Test are based upon visual inspection of various engine components and comparison with a series of CRC reference standards.

Results of this test using each of the above-described lubricating compositions are summarized below.

For comparison purposes, minimum SE standard lubricating oil qualification ratings are also presented.

| | COMPOSITION | | |
|---|---|---|---|
| REFERENCE SEQUENCE VC RESULTS | 1 | 2 | SE MINIMUM RATINGS |
| Average Overall Sludge Rating | 8.7 | 8.1 | 8.5 |
| Average Overall Varnish Rating | 8.3 | 7.8 | 8.0 |
| Piston Skirt | 8.3 | 8.0 | 7.9 |

The above data indicate that compositions which include solid particles cause a substantial decrease in sludge and varnish ratings (increase in sludge and varnish formation). This conclusion is apparent by comparing the results from Composition 2 with those from the non-graphite containing Composition 1. Thus, the inclusion of the conventional viscosity index improver, which provides adequate sludge and varnish formation protection (see Example 1) when included in a composition without solid particles, fails to meet the SE qualification standards when such solid particles are added.

The sequence V C Test described in Examples 1 and 2 illustrate the problems in formulating a suitable solids particles-containing lubricating composition. Examples 3 and 4 are lubricating compositions in accordance with the invention. These lubricating compositions containing graphite and certain defined functional polymers provide reduced sludge and varnish deposition relative to lubricating compositions not containing these polymers, and are illustrative of the improved solids-containing lubricating compositions of the invention.

While this invention has been described with respect to various specific examples and embodinents, it is to be understood that the invention is not limited thereto and that it can be variously practiced within the scope of the following claims.

The embodiments of the invention in which an exclusive property or privilege is claimed are defined as follows:

1. A composition of matter comprising a major amount by weight of oil of lubricating viscosity; a minor amount by weight of solid particles effective to improve the lubricating properties of said composition; and a minor amount by weight of a functional polymer, said functional polymer being the reaction product of (1) an oxidized high molecular weight amorphous copolymer of essentially ethylene and propylene having a number average molecular weight of at least about 20,000, and at least 140 pendant methyl groups per 1,000 chain carbon atoms reacted with (2) an aliphatic amine or polyamine, said polymer being present in an amount effective to reduce the deposit forming tendencies of said composition.

2. The composition of claim 1 wherein a major portion of said solid particles have a maximum transverse dimension in the range of about 1 millimicron to about 2 microns.

3. The composition of claim 1 wherein said solid particles are selected from the group consisting of graphite, molybdenum disulfide, zinc oxide and mixtures thereof, said solid particles are present in an amount of about 0.05% to about 5% by weight of the total composition and said functional polymer is present in an amount of about 0.1% to about 12% by weight of the total composition.

4. The composition of claim 1 wherein said functional polymer is present in an amount of at least about 2 times the amount of said solid particles.

5. The composition according to claim 1 wherein the oxidized copolymer has a molecular weight of from about 20,000 to 200,000.

6. The composition according to claim 5 wherein the aliphatic amine is a primary or secondary aliphatic amines and diamines of the general formula $H_2N(CH_2)_yNH_2$, wherein y is an integer 3 to 10, said amines and diamines containing up to about 10 carbon atoms in the alkyl group, and the polyamine is a polyalkylene polyamines of the formula

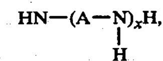

wherein A is a divalent alkylene radical of about 2 to about 6 carbon atoms, and x is an integer from 1 to about 10.

7. The composition of according to claim 6 wherein the functional polymer is prepared by reacting simultaneously, at a temperature of about 140°-350° F. the oxidized copolymer of essentially ethylene and propylene with an aliphatic amine or polyamine, and recovering the resultant reaction product; said reactants being employed in the molar ration of from about 1:2 to about 1:20.

8. The composition of claim 7 wherein the functional polymer has a number average molecular weight in the range of from about 25,000 to about 40,000.

9. The composition of claim 1 wherein said functional polymer is prepared by additionally simultaneously reacting with (1) and (2) a formaldehyde-yielding reactant.

10. The composition according to claim 6 wherein the functional polymer is prepared by reacting simultaneously, at a temperature of about 250°-350° F., an oxidized copolymer of ethylene and propylene, a formaldehyde-yielding reactant, and an aliphatic amine or polyamine, and recovering the resultant reaction product; said reactants being employed in the molar ratio of from 1:2:2 to about 1:20:20.

11. The composition of any one of claims 3-10 wherein said solid particles are graphite, molybdenum disulfide and mixtures thereof.

12. A method of lubricating an internal combustion engine comprising components requiring lubrication which comprises maintaining a lubricating amount of the composition of claim 1 of components of said engine requiring lubrication.

* * * * *